(12) United States Patent
Hosoe et al.

(10) Patent No.: US 9,022,423 B2
(45) Date of Patent: May 5, 2015

(54) AIRBAG DEVICE

(71) Applicant: Autoliv Development AB, Vårgårda (SE)

(72) Inventors: Naoki Hosoe, Yokohama (JP); Hitoshi Koyama, Yokohama (JP)

(73) Assignee: Autoliv Development AB, Vårgårda (SE)

( * ) Notice: Subject to any disclaimer, the term of this patent is extended or adjusted under 35 U.S.C. 154(b) by 0 days.

(21) Appl. No.: 14/225,976

(22) Filed: Mar. 26, 2014

(65) Prior Publication Data
US 2014/0300092 A1    Oct. 9, 2014

(30) Foreign Application Priority Data

Apr. 9, 2013  (JP) .................................. 2013-081397

(51) Int. Cl.
*B60R 21/239* (2006.01)
*B60R 21/2338* (2011.01)

(52) U.S. Cl.
CPC ..... *B60R 21/239* (2013.01); *B60R 2021/23382* (2013.01); *B60R 2021/2395* (2013.01)

(58) Field of Classification Search
CPC .................. B60R 21/239; B60R 2021/2395; B60R 2021/2765; B60R 21/237

USPC ............................................... 280/739, 743.2
See application file for complete search history.

(56) References Cited

U.S. PATENT DOCUMENTS

| 7,731,231 | B2* | 6/2010 | Schneider et al. | 280/739 |
| 7,770,922 | B2* | 8/2010 | Schneider et al. | 280/739 |
| 2004/0188990 | A1* | 9/2004 | Short et al. | 280/739 |
| 2006/0071461 | A1* | 4/2006 | Williams et al. | 280/739 |
| 2008/0252053 | A1* | 10/2008 | Schneider et al. | 280/742 |

FOREIGN PATENT DOCUMENTS

JP    2008-207579    9/2008

* cited by examiner

*Primary Examiner* — Ruth Ilan
(74) *Attorney, Agent, or Firm* — Brinks Gilson & Lione

(57) ABSTRACT

An airbag device for stably controlling gas discharge and restraining an occupant in a vehicle. A first vent hole, for discharging gas from the airbag, is formed in a portion of the airbag, and one end of a tubular discharge restricting member is connected to the first vent hole. Once the airbag is inflated and deployed to a predetermined extent or more, the first vent hole is closed by the discharge restricting member. Prior to deployment, at least a portion of the airbag is folded in a bellows shape to form a folded portion. The connecting portion between the discharge restricting member and the first vent hole is positioned in a trough portion of the folded portion. The other end of the discharge restricting member is stored so as to face the outer side and not to protrude beyond an outer edge of the folded portion.

20 Claims, 4 Drawing Sheets

Enlarged view along line A-A

AIRBAG DEVICE

BACKGROUND

1. Field of the Invention

The present invention relates to an airbag device that restrains an occupant in a vehicle. More specifically, the present invention relates to an improvement of an airbag device having a vent control mechanism that uses a tubular member.

2. Description of the Related Art

Examples of an airbag device include a driver's seat airbag device stored in the central portion of a steering wheel (handle), an assistant driver's (passenger's) seat airbag device stored in an instrument panel (dashboard), a curtain airbag device deployed from the vicinity of a roof rail so as to cover a window, a side airbag device incorporated into a seat, and the like. The airbag device is designed to protect an occupant from an impact using an airbag to absorb and mitigate the impact in the event of a crash.

However, general airbag devices have such a structure that an airbag is instantly inflated by high-pressure gas jetted from an inflator and is deployed in a predetermined direction. When an occupant or the like collides with an airbag during an initial stage of inflation and deployment, a serious impact during the inflation may act on the occupant or the like and the potential for injury from the airbag may increase. In order to prevent this, various vehicle airbag devices have been proposed.

In one vehicle airbag device, a plurality of inflators that mitigate an impact acting on an occupant or the like is provided so as to detect in advance the occupant or the like approaching an airbag in the initial stage of inflation and deployment of the airbag and to adjust the inflation pressure of the airbag accordingly. In the initial stage of inflation and deployment, high-pressure gas is jetted from one inflator. After that, the high-pressure gas is jetted from the plurality of inflators. In this way, the airbag is allowed to be deployed in a predetermined shape.

As another airbag device, initial pressure during inflation of the airbag is sufficiently high, but the gas discharged from a vent hole is distributed to a wide range of areas. In such an airbag device, a tubular nozzle is extended from the vent hole formed in the airbag, and this nozzle is stored in the airbag when the airbag is in a folded state. Due to this, during the initial stage of inflation of the airbag, the nozzle is pressed against the inner wall of the airbag due to internal pressure of the airbag, and the vent hole is closed. Once an initial internal pressure is attained, as well as when the internal pressure of the airbag becomes higher than predetermined pressure, the nozzle is pushed outside the airbag from the vent hole and spreads in a tubular form to distribute the gas discharged from the vent hole in a wide range of areas while shaking.

In the airbag configured to detect in advance the occupant or the like approaching the airbag in the initial stage of inflation and deployment of the airbag, it is necessary to adjust an opening size of the vent hole formed in the airbag using electromagnetic switch means or to equip detection means for detecting the occupant or the like. Thus, there is a problem in that the airbag device becomes complex and expensive. Moreover, in an airbag having a plurality of inflators, it is difficult to adjust the ignition time of the inflators, and the inflation pressure of the airbag in the initial stage of inflation is not sufficient. Thus, there is a problem in that sufficient impact absorbing power is not obtained.

Therefore, there is a demand for an airbag device capable of adjusting the internal inflation pressure of an airbag according to the stage of inflation and deployment of the airbag. To meet such a demand, for example, Japanese Patent Application Publication No. 2008-207579 proposes a structure in which one end of a flexible tubular member is connected to a vent hole and the tubular member is pulled into an airbag in response to inflation of the airbag to restrict gas discharge of the vent hole. In such a structure, a tubular control member is extended to the outside of the airbag in the initial stage of inflation and deployment of the airbag. When an occupant or the like comes into contact with an occupant restraint surface, a portion of high-pressure gas in the airbag is discharged outside from the vent hole and the internal inflation pressure of the airbag decreases. Thus, even when the occupant or the like approaches the airbag in the event of a vehicle crash and the occupant or the like comes into contact with the airbag during the initial stage of inflation and deployment, it is possible to reliably restrain the occupant or the like while decreasing repulsive force acting on the occupant or the like. Moreover, in a normal state where the occupant or the like is away from an inflated and deployed airbag, the control member is pulled into the airbag. Thus, it is possible to prevent the gas from being discharged from the vent hole. As a result, the airbag can be inflated and deployed by effectively utilizing the pressure of gas jetted from the inflator and can provide sufficient impact absorbing power.

However, in the structure in which the tubular member is connected to the vent hole, there is a problem in that the gas discharge performance (gas discharge volume) of the vent hole varies depending on how the airbag and the tubular member are folded.

SUMMARY

The present invention has been made in view of the above problems, and an object of the present invention is to provide an airbag device capable of stably controlling gas discharge.

In order to attain the object, the present invention provides an airbag device that restrains an occupant in a vehicle by inflating and deploying an airbag, wherein a first vent hole for discharging gas inside the airbag is formed in a portion of the airbag, one end of a tubular discharge restricting member is connected to the first vent hole, the first vent hole is configured to be closed by the discharge restricting member when the airbag is inflated and deployed to a predetermined extent or more. At least a portion of the airbag is folded in a bellows shape to form a folded portion, a connecting portion between the discharge restricting member and the first vent hole is positioned in a trough portion of the folded portion, and the other end of the discharge restricting member is stored to face the outer side and not to protrude outside an outer edge of the folded portion.

Here, the trough portion of the folded portion is not limited to the complete end of a concave portion, but may be positioned slightly on the outer side in a range where the discharge restricting member is not bent halfway. Moreover, "not to protrude" means a case where the other end protrudes slightly within a range where the distal end of the discharge restricting member is not bent or gas discharge is not prevented too much in the initial stage of deployment as well as a case where the other end never protrudes.

Moreover, the "outer side" in the expression that the other end of the discharge restricting member faces the "outer side" without protruding toward the "outer side" than the outer edge of the folded portion corresponds to the peak portion (the opposite of the trough portion) of the folded portion when the airbag is in the folded state, and literally, corresponds to the outer side of the airbag surface when the airbag is in the deployed state. The left side of FIGS. 4A and 4B is the outer side.

According to the present invention having such a configuration, the tubular discharge restricting member does not protrude toward the outer side of the airbag in the stored state (in the non-deployed state of the airbag). Due to this, the discharge restricting member can maintain a state of straightly extending toward the outer side without being bent, the first vent hole can be quickly put into an open state in the initial deployment state of the airbag. Thus, it is possible to realize stable gas discharge control. That is, it is possible to stably control the closing timing and the gas discharge volume of the first vent hole (safety vent).

The discharge restricting member may maintain a state of extending toward the outer side of the airbag without being bent when the airbag is stored without being deployed. Due to such a structure, the discharge restricting member can easily maintain a stable attitude without being bent by being interposed between the upper and lower airbags.

The airbag device may further include a tether of which one end is connected to the discharge restricting member and the other end is connected to the inside of the airbag, and the discharge restricting member is closed by being pulled into the airbag by the tether when the airbag is deployed to a predetermined extent or more. Due to such a configuration, it is possible to control the opening and closing of the discharge restricting member with a simple structure.

A second vent hole that is always open may be formed in the airbag in addition to the first vent hole. Due to such a structure, it is possible to increase an adjustment range in which the internal pressure of the airbag is controlled. That is, when an occupant abnormally approaches the airbag, it is possible to further decrease the internal pressure of the airbag in the initial stage of deployment and to decrease the injury level of the occupant.

BRIEF DESCRIPTION OF THE DRAWINGS

FIGS. 2A to 2C are diagrammatic illustrations of the state where the airbag according to the embodiment of the present invention is folded, in which FIG. 2A is a plan view, FIG. 2B is a side view, and FIG. 2C is a cross-sectional view along line A-A of FIG. 2B;

DETAILED DESCRIPTION

Figure 1:
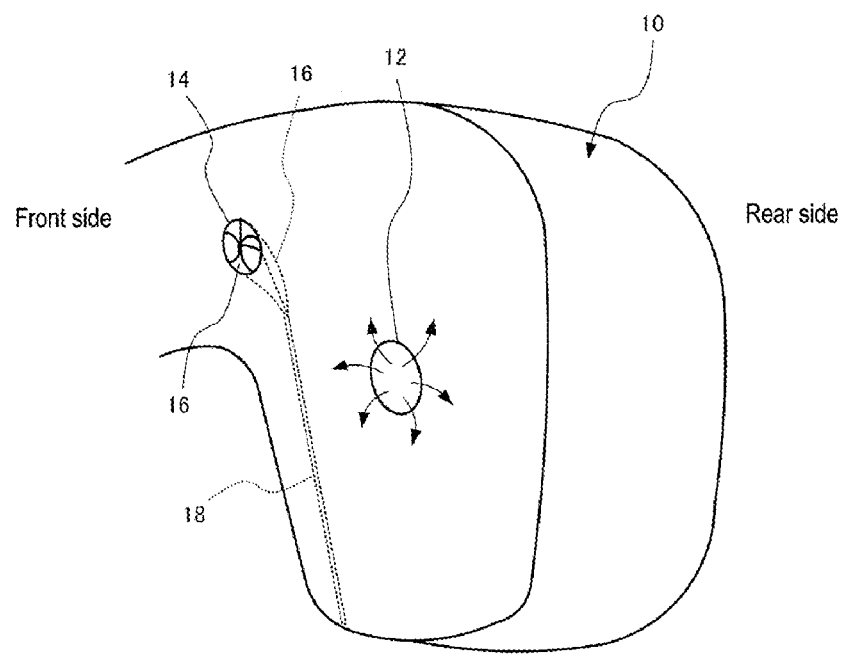
FIG. 1 is a perspective view illustrating a deployed state of an airbag device according to an embodiment of the present invention.

Preferred embodiments of the present invention will be explained next in detail by way of an assistant driver's (passenger's) seat airbag device with reference to accompanying drawings. In the description and the drawings, elements having substantially the same function and configuration are denoted by identical reference numerals, and a recurrent explanation thereof will be omitted. Elements that are not directly related to the present invention are omitted in the drawings.

The present invention relates to an airbag device that restrains an occupant in a vehicle by inflating and deploying an airbag 10. The present invention can be applied to other airbag devices, such as a driver's seat airbag device, as well as an assistant driver's seat airbag device. In FIG. 1, a first vent hole 14 that discharges gas from inside the airbag 10 is formed in a portion of a side surface of the airbag 10 on a vehicle interior side. If two of the first vent holes 14 are formed on both left and right side surfaces of the airbag 10, one first vent hole of the airbag on a vehicle exterior side can be formed at a position symmetrical to another first vent hole on the vehicle interior side when seen from the occupant side. Here, the "vehicle exterior side" means a side close to the door as seen from the occupant side when the airbag is an assistant driver's seat airbag or a driver's seat airbag, and the "vehicle interior side" means the opposite side.

The first vent hole 14 is configured to be opened and closed according to a deployment state of the airbag 10, and the details thereof will be described hereafter. A second vent hole 12, as an always open hole, is also formed in the airbag 10 in addition to the first vent hole 14. The second vent hole 12 may be formed near the center of a side surface of the airbag in the deployed state. Moreover, the first vent hole 14 is formed on the front side (inflator side) of the second vent hole 12.

Figure 2A:
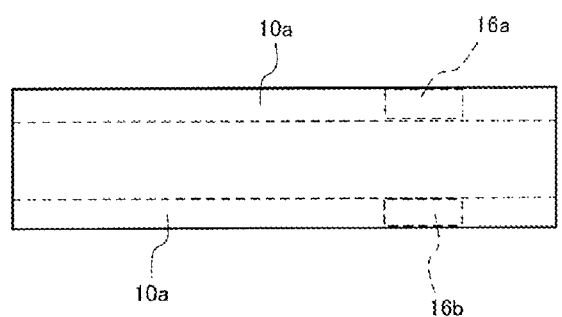
Figure 2B:
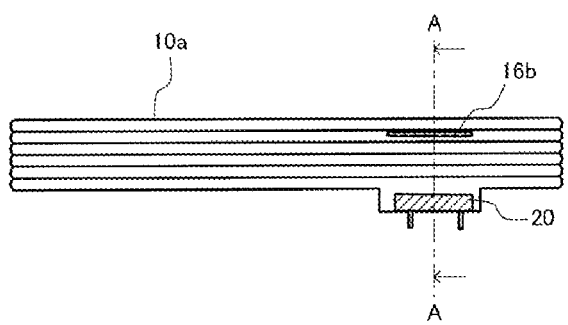
Figure 2C:
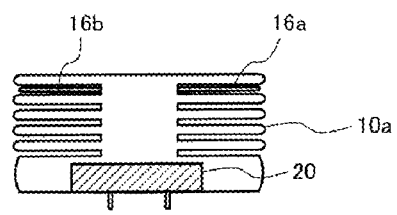

As illustrated in FIGS. 2B and 2C, an inflator 20 that generates inflation gas is disposed inside the airbag 10. Referring to FIG. 1, the inflator 20 is disposed further closer to the front side of the first vent hole 14. In FIG. 1, the "front side" indicates a vehicle advancing direction, and the "rear side" indicates a vehicle cabin side (occupant side).

One end of a tubular discharge restricting member 16 is connected to the first vent hole 14. The discharge restricting member 16 can be formed in a cylindrical form using the same fabric as the airbag 10, for example. In a state where the airbag 10 is not fully deployed, as illustrated in FIG. 3 and FIGS. 4A and 4B, the other end of the discharge restricting member 16 is extended to the outside of the airbag 10.

Returning to FIG. 1, a tether 18 is connected to the discharge restricting member 16. One end of the tether 18 is connected to the discharge restricting member 16, and the other end is connected near the bottom of the airbag 10. In the connection portion between the tether 18 and the airbag 10, it is preferable that, during normal deployment, tension is generated in the tether 18 and gas discharge is restricted to close the first vent hole 14. Moreover, it is preferable that, even when the airbag 10 restrains an occupant seating at a normal seating position, tension is generated in the tether 18 and gas discharge is restricted to close the first vent hole 14. In this way, it is possible to appropriately control the opening and closing of the first vent hole 14.

Figure 3:
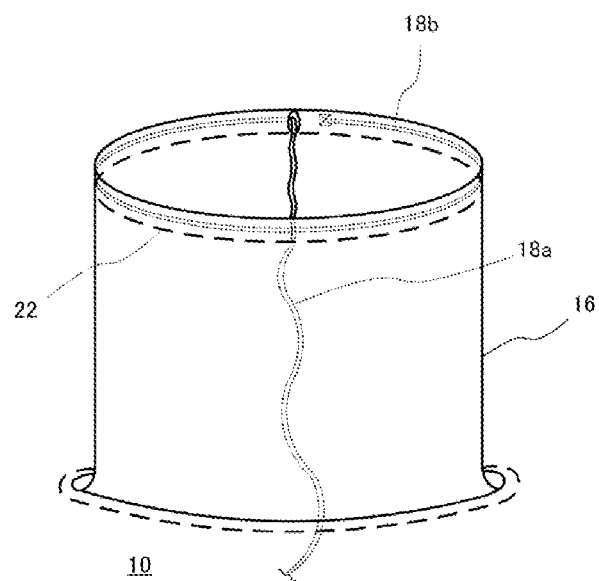
FIG. 3 is an enlarged perspective view illustrating the structure of a main part (discharge restricting member) of the airbag according to the embodiment of the present invention.
Figure 4A:
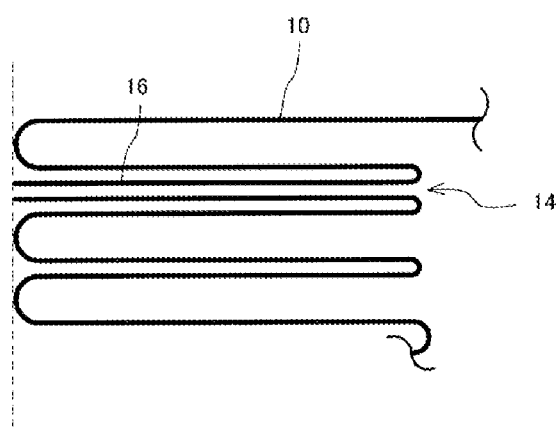
FIGS. 4A and 4B are explanatory diagrams illustrating a folded state of the airbag according to embodiments incorporating the principles of the present invention.
Figure 4B:
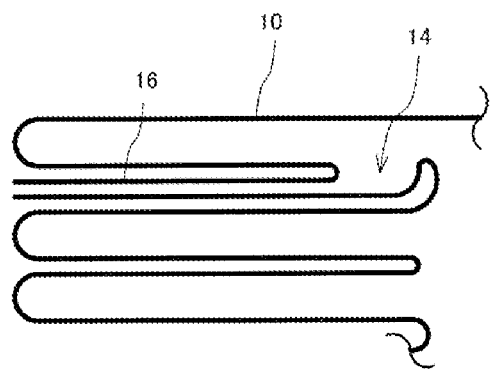

Referring to FIG. 3, the other end (free end) of the discharge restricting member 16 is turned down back over itself and sewn to form a bag-shaped sewn portion 22. An elastic portion 18b of the tether 18 is inserted in the bag-shaped sewn portion 22, and a connecting portion 18a of the tether 18, connected to the airbag 10 and is connected to the elastic portion 18b. When the airbag 10 is deployed to a predetermined extent or more, the connecting portion 18a which is normally loose pulls the elastic portion 18b, and the discharge restricting member 16 is pulled into the airbag 10 and is closed in a pouch shape.

An opening such as a slit is formed in a portion of the bag-shaped sewn portion 22 so that an end portion (the connecting portion 18a) of the tether 18 passes through the opening. This is similar to the structure of a trouser of such a type that a waist part is fastened by a band. The tether 18 may be formed of one tether and may be formed by joining a plurality of tethers. For example, when the tether 18 is formed of one tether, an end portion of the elastic portion 18*b* that is not connected to the connecting portion 18*a* may be fixed by sewing or the like to an intermediate portion of the bag-shaped sewn portion 22.

FIGS. 2A to 2C are diagrams illustrating the state where the airbag 10 is folded, in which FIG. 2A is a plan view, FIG. 2B is a side view, and FIG. 2C is a cross-sectional view along line A-A of FIG. 2B. FIG. 4A also illustrates a folded state of the airbag 10. When the airbag 10 in the folded state is seen from above, bellows-shaped folded portions 10*a* and 10*b* are formed at opposite end portions as illustrated in FIG. 2A. The base (that is, the first vent hole 14) of the discharge restricting member 16 (two oppositely positioned discharge restricting member 16*a*, 16*b* been seen in FIGS. 2A to 2C) is positioned in the trough portions (see FIG. 4) of the folded portions 10*a* and 10*b* of the airbag 10. Here, the trough portions of the folded portions 10*a* and 10*b* are not necessarily limited to the complete ends of concave portions as illustrated in FIG. 4A, but the trough portions may be positioned slightly on the outer side of the trough portion in a range where the discharge restricting member 16 (16*a*, 16*b*) is not bent halfway or folded upon itself, as seen in FIG. 4B. Moreover, the outer end or distal portion of the discharge restricting member 16 (16*a*, 16*b*) is disposed so as not to protrude toward the outer side more than the outer or lateral ends of the folded portions 10*a* and 10*b*. Here, "so as not to protrude" means a case where the outer end portion may protrude slightly within a range where the distal end is not bent or folded over, or gas discharge is not prevented too much in the initial stage of deployment, as well as a case where the outer end portion of the discharge restricting member 16 (16*a*, 16*b*) never protrudes beyond the lateral ends of the folded portions 10*a* and 10*b*. However, it is obvious that excellent attitude stability is obtained when the outer end portion does not protrude completely.

In the present embodiment, when the airbag 10 is in a stored state (non-deployed state), although the tubular discharge restricting member 16 (16*a*, 16*b*) extends toward the outside of the airbag 10, since the discharge restricting member 16 (16*a*, 16*b*) does not protrude from the outer edge of the airbag 10, the discharge restricting member 16 (16*a*, 16*b*) can maintain a state of straight extension without being bent halfway or folded over on itself (see FIGS. 4A and 4B). Due to this, the first vent hole 14 can be quickly put into an open state in the initial deployment stage of the airbag 10 and the gas discharge resistance is minimized. Thus, it is possible to realize stable gas discharge control in the initial stage of deployment. Moreover, since the discharge restricting member 16 (16*a*, 16*b*) is interposed between the upper and lower folded portions 10*a* and 10*b*, the discharge restricting member 16 (16*a*, 16*b*) can ideally maintain the straight (flat) state.

In the present embodiment, when the inflator 20 operates, the airbag 10 folded in the state illustrated in FIGS. 2A to 2C starts to be deployed. Here, when an occupant is positioned close to the airbag 10, the airbag 10 comes into contact with the occupant in the initial stage of deployment. In this case, the tether 18 is not fully extended, the discharge restricting member 16 (16*a*, 16*b*) is extended outside the airbag 10, and the first vent hole 14 maintains an open state. Thus, the internal pressure of the airbag 10 decreases, and the impact on the occupant is mitigated. When the occupant is seating at a normal seating position, the airbag 10 is quickly deployed, the tether 18 is fully extended and pulled taunt, the discharge restricting member 16 (16*a*, 16*b*) is pulled into the airbag 10 by the tether 18, and the first vent hole 14 is quickly closed to create a full deployment state at an early stage so that the occupant can be quickly restrained. In the present embodiment, by appropriately controlling the storage attitude of the discharge restricting member 16 (16*a*, 16*b*), it is possible to stably control the closing timing and the gas discharge volume of the first vent hole 14 (14*a*, 14*b*).

While the embodiment of the present invention has been described, the present invention is not limited to the embodiment, and various changes can be made within the scope of the technical spirit described in the claims.

We claim:

1. An airbag device for restraining an occupant in the cabin of an automotive vehicle, the airbag device comprising:
   an airbag coupled to an inflator, the inflator configured to cause inflation and deployment of the airbag, at least one first vent hole defined in the airbag to exhaust inflation gas from inside the airbag;
   an exhaust control portion having a base and a distal end, the base of the exhaust control portion being connected about the first vent hole and the exhaust control portion extending outwardly from the airbag;
   in a non-deployed configuration, the airbag having folded portions defining troughs and peaks, the troughs being located inwardly of the non-deployed configuration and peaks defining an outer side of the non-deployed configuration, the exhaust control portion being located between the folded portion of the airbag with the base of the exhaust control portion being located at one of the troughs of the non-deployed configuration and the distal end of the exhaust control portion being located at or inwardly of the outer side of the non-deployed configuration.

2. The airbag device of claim 1, wherein the distal end of the exhaust control portion is adjacent to the outer side of the non-deployed configuration.

3. The airbag device of claim 1, wherein the exhaust control portion is tubular in shape.

4. The airbag device of claim 1, wherein, in the non-deployed configuration of the airbag, the exhaust control portion extends linearly from the base to the distal end.

5. The airbag device of claim 1, wherein, in the non-deployed configuration of the airbag, the exhaust control portion extends in a straight manner from the base to the distal end.

6. The airbag device of claim 1, wherein, in the non-deployed configuration of the airbag, the exhaust control portion extends along a straight line from the base to the distal end.

7. The airbag device of claim 1, wherein, in the non-deployed configuration of the airbag, the exhaust control portion extends outwardly from the base to the distal end.

8. The airbag device of claim 1, wherein, in the non-deployed configuration of the airbag, the exhaust control portion extends from the base to the distal end without folds being formed between the base and the distal end.

9. The airbag device of claim 1, wherein the exhaust control portion is configured to close off the first vent hole upon the airbag inflating and deploying above a predetermined volume.

10. The airbag device of claim 1, further comprising a second vent hole defined in the airbag, the second vent hole being permanently in an open configuration to exhaust inflation gas from inside the airbag.

11. The airbag device of claim 1, wherein a tether is connected between the airbag and the exhaust control portion.

12. The airbag device of claim 11, wherein the tether is connected to the distal end of the exhaust control portion.

13. The airbag device of claim 11, wherein the tether extends through the first vent hole.

14. The airbag device of claim 11, wherein a portion of the tether encircles the distal end of the exhaust control portion.

15. The airbag device of claim 14, wherein the portion of the tether encircling the distal end of the exhaust control portion is configured to draw closed the distal end of the exhaust control portion.

16. The airbag device of claim 11, wherein the tether has a length that is less than an unrestrained length from the first vent hole to an attachment point of the tether to the airbag upon full inflation and deployment of the airbag by the inflator, whereby the exhaust control portion is drawn by the tether through the first vent hole into the airbag when the airbag is inflated and deployed above a predetermined volume.

17. The airbag device of claim 11, wherein, in the non-deployed configuration of the airbag, the exhaust control portion extends from the base to the distal end without folds being formed between the base and the distal end.

18. The airbag device of claim 11, wherein, in the non-deployed configuration of the airbag, the exhaust control portion extends outwardly from the base to the distal end.

19. The airbag device of claim 11, wherein the distal end of the exhaust control portion is adjacent to the outer side of the non-deployed configuration.

20. The airbag device of claim 11, wherein the tether extends through the exhaust control portion.

* * * * *

UNITED STATES PATENT AND TRADEMARK OFFICE
CERTIFICATE OF CORRECTION

PATENT NO. : 9,022,423 B2  
APPLICATION NO. : 14/225976  
DATED : May 5, 2015  
INVENTOR(S) : Maoki Hosoe and Hitohi Koyama Page 1 of 1

It is certified that error appears in the above-identified patent and that said Letters Patent is hereby corrected as shown below:

In the Claims

Col. 6, in claim 1, line 25, after "folded" delete "portion" and insert --portions--.

Signed and Sealed this
Fifteenth Day of September, 2015

Michelle K. Lee
*Director of the United States Patent and Trademark Office*